Jan. 22, 1957  G. E. KLOOTE ET AL  2,778,766
METHOD OF FORMING A COMBINATION HOLLOW DOOR AND SOLID FRAME
Filed March 24, 1954  2 Sheets-Sheet 1

INVENTORS
GEORGE E. KLOOTE
JOSEPH A. POTCHEN
BY
ATTORNEY

Jan. 22, 1957   G. E. KLOOTE ET AL   2,778,766
METHOD OF FORMING A COMBINATION HOLLOW DOOR AND SOLID FRAME
Filed March 24, 1954   2 Sheets-Sheet 2
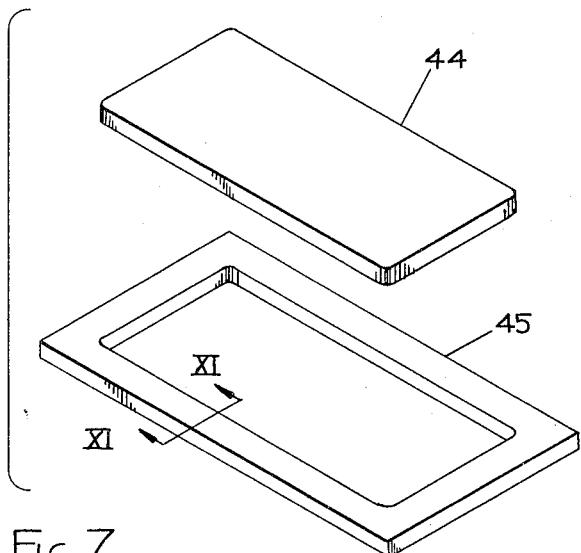
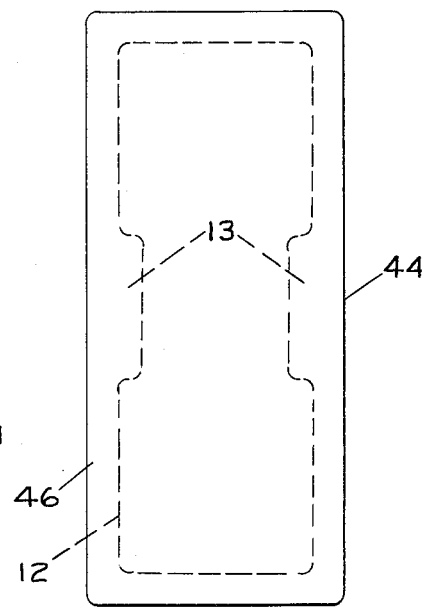
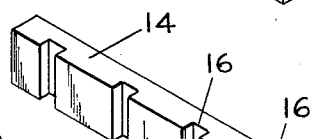
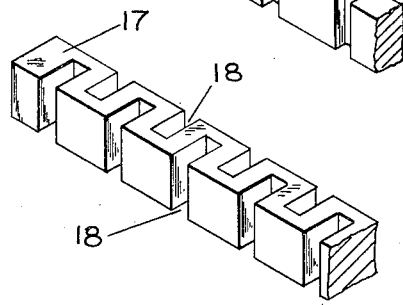
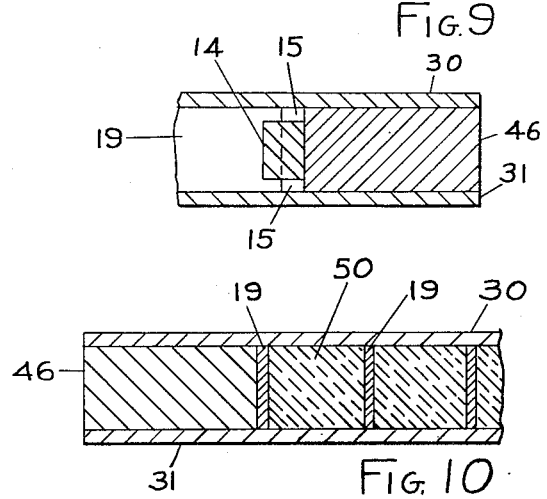
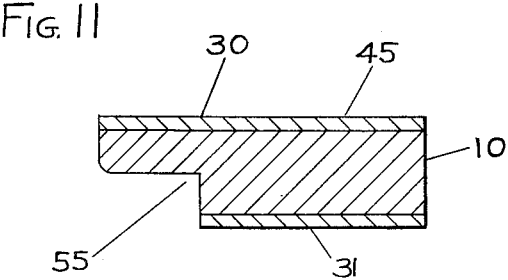
INVENTORS
GEORGE E. KLOOTE
JOSEPH A. POTCHEN
BY Peter P. Price
ATTORNEY

2,778,766

METHOD OF FORMING A COMBINATION HOLLOW DOOR AND SOLID FRAME

George E. Kloote, Grand Rapids, and Joseph A. Potchen, Marne, Mich., assignors to Haskelite Manufacturing Corporation, Grand Rapids, Mich., a corporation of New York Application March 24, 1954, Serial No. 418,386

7 Claims. (Cl. 154—118)

This invention relates to the construction of laminated closures and particularly to a method of fabricating a hollow core door and its mounting frame from a single laminated panel assembly.

While this invention has particular utility when applied to the fabrication of doors and frames for house trailer units, it will be recognized that the utility and scope of the invention extend far beyond this particular purpose. Therefore, the description of this invention as applied to this problem is not to be considered as a limitation upon its scope.

The primary object of this invention is to provide a door and frame so related that the door is a positive fit within the frame with the opening between the door and the frame no greater than that necessary to permit the proper functioning of the door. Such an opening materially reduces the problem of providing proper weather stripping and sealing about the door to eliminate air leakage.

Another object of the invention is to provide a door and frame construction which may be rapidly fabricated, effecting substantial economies in both labor and materials. The invention effects substantially economy in labor by forming the frame and the door simultaneously with the same assembly operations creating both. Substantial economy in materials is effected by reducing the waste incident to separately forming and trimming the individual components. This is particularly true under circumstances where the central portion of the core slab which is initially removed to form the hollow portion of the door may be used in other fabrication operations, thus, eliminating waste of this material. It is also true that the portion of the core so removed may, with minor trimming operations, be used as a portion of another core forming a substantial portion of the material necessary for that core.

Since each of the frames may be fabricated without consideration of the exact spacing of the interior edge of the frame from the door, the exterior of the frame may be readily formed to close dimensions. The resulting panel, before severance of the door from the frame, may be machined to close tolerances on all four sides. This greatly facilitates standardization of the frame for installation in close tolerance openings.

These and other objects and purposes of the invention will be immediately seen by those acquainted with the design and construction of laminated panel structures upon reading the following specification and the accompanying drawings.

In the drawings:

Fig. 4 is an exploded, oblique view of the panel assembly after severance of the door portion from the frame portion of the panel.

Fig. 5 is a front view of the completed door.

Fig. 7 is a fragmentary, enlarged, oblique view of the end rails for the ribs.

Fig. 8 is an enlarged, fragmentary, oblique view of a center rail for the ribs.

Fig. 9 is a fragmentary, enlarged, sectional view taken along the plane IX—IX of Fig. 2.

Fig. 10 is an enlarged, fragmentary, sectional view taken along the plane X—X of Fig. 2.

Fig. 11 is an enlarged, sectional view taken along the plane XI—XI of Fig. 4 but showing a modified construction for the peripheral edge of the frame.

In carrying out the method of this invention, a solid core slab is laid up and bonded. The center of this core slab is then removed to form an interior opening corresponding to the size and shape of the hollow portion of the door to be cut from the ultimate assembly. Within this opening are mounted the ribs for supporting the facing sheets. With the ribs in place, facing sheets are placed over the entire assembly and bonded both in the peripheral portion of the core slab and to the ribs to form a panel. The center of the panel is then severed from the peripheral portion of the panel to form a door, the peripheral portion of the panel assembly forming an annular, closed frame within which the door will automatically fit.

Figure 1:
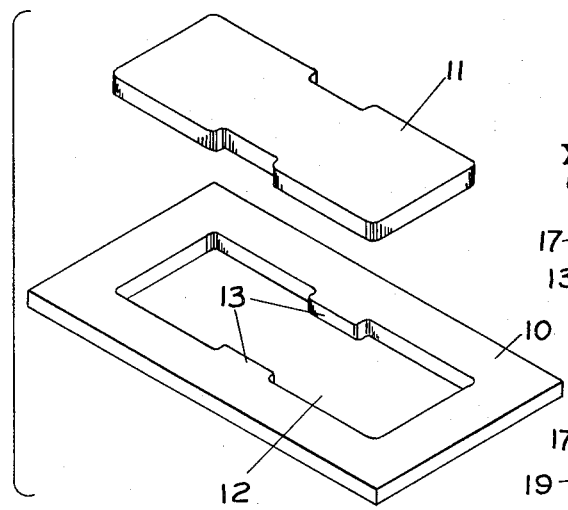
Fig. 1 is an oblique exploded view of the core slab with the central portion of the slab removed.

Referring specifically to the drawings, in Fig. 1 there is shown a core slab 10. The core slab may consist of any suitable material such as a number of individual strips laminated together by suitable adhesives to form a slab of the desired size and thickness. It may also consist of laminated sheets. Any core slab useable in the fabrication of a solid core panel is satisfactory.

When the core slab 10 has been assembled and sanded to the desired thickness, the center piece 11 is cut out to form the opening 12. Since the cut by which the center piece is severed must form a closed path, it is preferably done by means of a router. The size of the opening 12 is determined by the size of the opening which it is desired to have in the hollow core door which will ultimately result from the use of this fabrication method. The center piece 11 is necked down at the center, leaving a pair of abutments 13 on the remainder of the core slab 10. The abutments 13 become the lock blocks of the door. They may also be used for any other purpose such as for the attachment of hinges or other accessories. Where such blocks are unnecessary it may be desirable to eliminate them. The center piece 11 is scrapped so far as the particular door and frame being assembled is concerned. It is, however, useful for other purposes such as by being incorporated in subsequent slabs. With slight trimming it may be used in the fabrication of the core slab 10 of subsequent units of this type. This is particularly true if the center piece is cut out before the faces of the slab are sanded.

Figure 2:
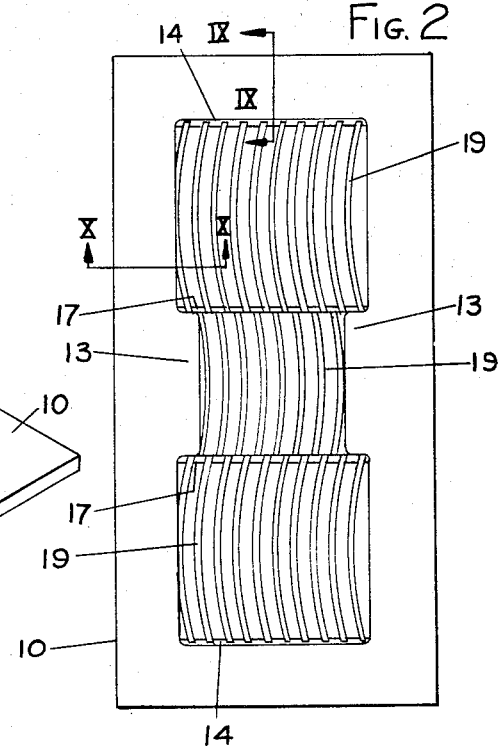
Fig. 2 is a front view of the core slab after installation of the ribs for the door.

After the center piece 11 has been removed, end rails 14 are mounted at each end of the opening 12 (Figs. 2 and 7). The end rails 14 are substantially narrower than the thickness of the core slab 10 (Fig. 9). This arrangement provides for air passageways 15 between the ends of the ribs 19, the core slab 10 and the facing sheets. The end rails are provided with equally spaced notches 16 to receive the ends of the ribs. The end rails are secured to the core slab 10 by any suitable means such as by an adhesive, nailing or stapling.

Center rails 17 are mounted within the central opening on each side of the lock blocks 13 (Figs. 2 and 8). The center rails are alternately deeply notched at 18 from each side. The notches 18 are equally spaced and each extends into the center rail more than half the thickness of the rail. The notches 18 on one side of the center rail are alternately spaced with relation to the notches 18 on the other side of the center rail. The center rails 17, like the end rails 14, are substantially narrower than the thickness of the core slab 10 to permit the free flow of air between the inter-rib spaces. The center rails 17 form passageways between the rails and the facing sheets similar to the passageways 15.

Mounted within the central opening 12 are groups of thin, parallel, arched ribs 19. The ribs in the upper and lower portions of the central opening are arched in the same direction with the ribs in the central portion of the opening arched in the opposite direction. The ribs 19 have a width equal to the thickness of the core slab 10 whereby they will contact and be bonded to the facing sheets (Fig. 10). The ends of the ribs are seated in the notches 16 and 18 in the end rails 14 and center rails 17 respectively.

Arched ribs are but one possible means of supporting the facing sheets in the area of the opening 12. Ribs or spacers of any other shape and design may be used with or without the center rails 17. Ribs of any type may be dispensed with entirely and such materials as expanded polystyrene, rigid expanded rubber, sheets of bonded fibers such as lignin bonded wood fiber or resin bonded cane fibers may also be used. This invention it not limited to the use of any particular material in the opening 12 for supporting the facing sheets.

Figure 6:
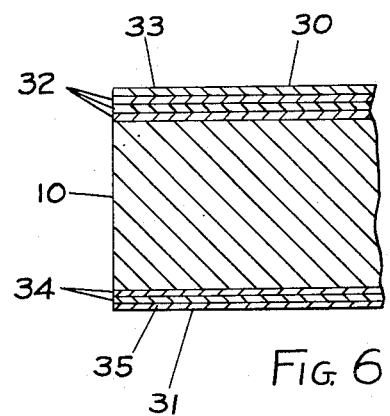
Fig. 6 is an enlarged, fragmentary, sectional view taken along the plane VI—VI of Fig. 3.

After the ribs or other supporting elements have been installed, the entire core slab 10 is covered on one face with a facing sheet 30 and on the other with a facing sheet 31. While it is possible to make the facing sheets of a single thickness of material, it is preferable that these sheets be laminated from several thicknesses of veneer with angularly disposed grains (Fig. 6).

As illustrative of what cna be done in the fabrication of this panel, the exterior facing sheet 30 may consist of several laminae 32 of wood with an exterior lamina 33 of metal such as stainless steel or aluminum. The interior facing sheet may consist of one or more inner laminae 34 of an inexpensive structural wood such as gum and a surface lamina 35 of an ornamental hard wood such as mahogany, birch, oak or walnut. In this manner, the desired interior and exterior finishing materials may be applied during the fabrication process, eliminating the necessity for separate application of these materials after the unit has been otherwise completed. The facing sheets 30 and 31 may be formed into complete, laminated panels before their application to the core 10.

Figure 3:
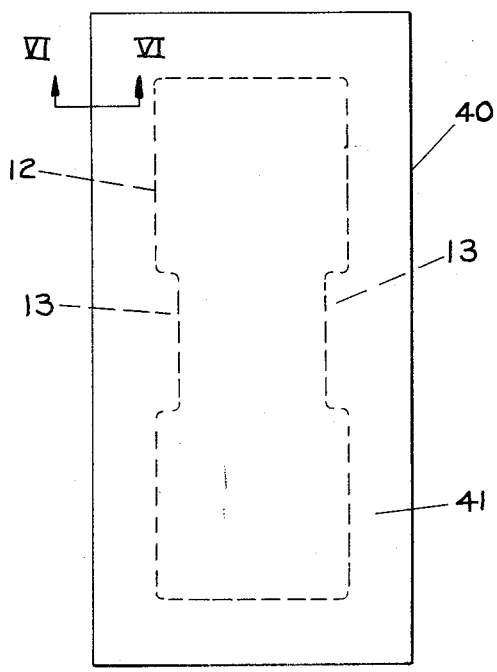
Fig. 3 is a front view of the panel assembly after mounting of the facing sheets.

The facing sheets 30 and 31 are secured to the core 10 and ribs 19 or other supporting material by a suitable adhesive. The mounting of the facing sheets produces a panel assembly 40 having the central opening 12 enclosed and surrounded by a wide peripheral frame 41 (Fig. 3).

After the formation of the panel assembly 40, the next step is to sever the door portion 44 from the frame portion 45. The severing of the door 44 from the rest of the panel assembly is preferably done in the same manner as the severing of the center piece 11 from the core slab 10. By use of a router tracing a closed path which does not extend through the periphery of the panel assembly at any point, the door portion 44 is severed from the rest of the panel assembly leaving a closed, ring-like or annular frame 45 (Fig. 4). In severing the door 44 from the frame 45, the router cut is spaced outwardly from the central opening 12 sufficiently to provide the door with an adequate, peripheral, structural frame 46 (Fig. 5). It is obvious that the resulting door 44 will always fit properly within the frame 45.

Various modifications of the basic procedure described above can be made. Among these is the addition of thermal insulation 50 between the ribs 19 (Fig. 10). The thermal insulation 50 will be installed at the same time as the ribs. This insulation may be of any suitable type such as fiber glass or rigid, expanded rubber.

Another modification consists in scarfing the edges of the panel assembly to provide an overlapped joint 55 whereby the edge of the frame may be seated against a similarly shaped panel when the frame is installed (Fig. 11). The inner corner of the projecting finger of the joint is rounded to eliminate all possibility of binding with the adjacent panel. Various other refinements may be made in this invention. However, each of these modifications which does not depart from the principle of the invention is to be considered as included in the hereinafter appended claims unless these claims, by their language, expressly state otherwise.

We claim:

1. In the method of fabricating a combination hollow door and solid frame, the steps which include: providing a panel having a central opening, surrounded by a solid border and having facing sheet supporting means seated therein; severing the frame portion of said panel from the door portion to form a closed annular frame and a hollow core door.

2. In the method of fabricating a combination hollow door and solid frame, the steps which include: providing a slab of the same size as said frame; removing the center of said slab to form an opening therein corresponding to the size and shape of the hollow center of said door; mounting facing sheet spacers in said opening; enclosing said slab in facing sheets to form a panel assembly; severing the door portion of said panel assembly from the frame portion thereof.

3. In the method of fabricating a combination hollow door and solid frame, the steps which include: providing a slab of the same size as said frame; removing the center of said slab to form an opening therein corresponding to the size and shape of the hollow center of said door; mounting ribs in said opening; enclosing said slab in facing sheets to form a panel assembly; severing the door portion of said panel assembly from the frame portion thereof.

4. In the method of fabricating a combination hollow door and solid frame, the steps which include: assembling a core; bonding together the components of said core; forming a central opening in said core corresponding to the size of the hollow center of said door; mounting ribs in said central opening; covering all of both faces of said core with facing sheets; bonding said facing sheets to said core to form a panel assembly; severing the inner portion of said panel assembly from the peripheral portion thereof along a path sufficiently spaced from the central opening therein to surround said central opening with a structural frame.

5. In the method of fabricating a combination hollow door and solid frame, the steps which include: providing a solid core slab; removing the center of said slab to create an opening corresponding to the size and shape of the hollow center of said door; mounting ribs in said opening; bonding facing sheets to said slab to form a panel assembly; along a path spaced sufficiently from the opening therein to surrounding said opening with a structural frame, severing the inner portion of said panel assembly from the peripheral portion thereof.

6. In the method of fabricating a door and frame combination, the steps which include: providing a panel; severing the central portion of said panel from the peripheral portion to form a door and a closed annular frame surrounding said door.

7. In the method of fabricating a door and frame combination, the steps which include: providing a panel; severing said panel along a line parallel to the sides of said panel to form a door and a peripheral frame therefor.

References Cited in the file of this patent
UNITED STATES PATENTS

| | | |
|---|---|---|
| 2,214,675 | Jensen | Sept. 10, 1940 |
| 2,479,870 | Rundquist | Aug. 23, 1949 |

OTHER REFERENCES

American Building, vol. No. 71, p. 134, November 1949.